(12) United States Patent
Kahlman

(10) Patent No.: US 6,351,438 B1
(45) Date of Patent: Feb. 26, 2002

(54) APPARATUS FOR READING AND/OR WRITING INFORMATION FROM/ONTO AN OPTICAL DATA CARRIER

(75) Inventor: Josephus A. H. M. Kahlman, Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/371,373

(22) Filed: Aug. 10, 1999

(30) Foreign Application Priority Data

Aug. 10, 1998 (NL) .............................................. 1009830

(51) Int. Cl.⁷ ................................................ G11B 7/00
(52) U.S. Cl. ................................ 369/44.32; 369/53.19; 369/53.12
(58) Field of Search ........................... 369/44.11, 44.14, 369/44.27, 44.28, 44.29, 44.32, 44.35, 44.34, 47.1, 53.1, 53.12, 53.11, 53.19, 53.2, 53.23, 53.28, 53.35, 53.41, 59.1

(56) References Cited

U.S. PATENT DOCUMENTS 5,751,680 A * 5/1998 Ishibashi et al. ......... 369/44.23
5,848,045 A * 12/1998 Kirino et al. ............. 369/47.53
5,978,332 A * 11/1999 Itakura et al. ........... 369/44.32

FOREIGN PATENT DOCUMENTS

EP  0569597 A1  11/1993

* cited by examiner

Primary Examiner—Muhammad Edun
(74) Attorney, Agent, or Firm—Laurie E. Gathman

(57) ABSTRACT

An apparatus in accordance with the invention for reading and/or writing information from/onto an optical data carrier (1) has a transducer (5) for generating a detection signal ($S_0$) in response to a signal (x) recorded on the data carrier. The apparatus has correction unit (16, 17, 18) for reducing errors in the detection signal ($S_0$) as a result of radial tilt. The apparatus further has error signal generating unit (20) for generating an error signal ($S_e$) for the correction unit (16, 17, 18). The error signal generating unit (20) calculate the error signal ($S_e$) from correlations between a first auxiliary signal ($S_1$) and a second auxiliary signal ($S_2$) and from correlations between the first auxiliary signal ($S_1$) and a third auxiliary signal ($S_3$), which auxiliary signals are derived from the detection signal ($S_0$). The second ($S_2$) and the third auxiliary signal ($S_3$) are estimates of the recorded signal (x). The first and the third auxiliary signal ($S_1$,$S_2$) respectively have a first delay and a second delay (T) with respect to the second auxiliary signal ($S_2$), the magnitude of the delays corresponding respectively to the duration of one revolution and two revolutions of the data carrier.

7 Claims, 9 Drawing Sheets

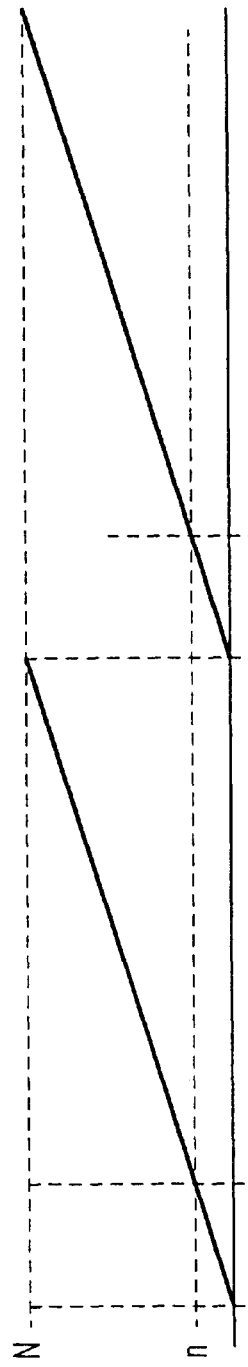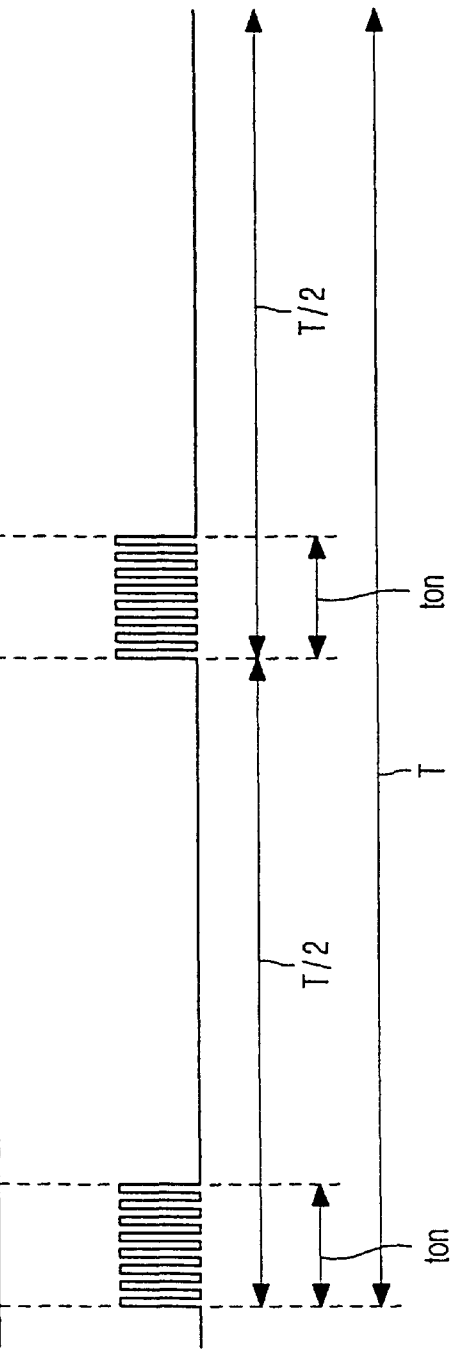
FIG. 7A
FIG. 7B
FIG. 7C

APPARATUS FOR READING AND/OR WRITING INFORMATION FROM/ONTO AN OPTICAL DATA CARRIER

BACKGROUND OF THE INVENTION

The invention relates to an apparatus as defined in the opening part of claim 1.

The invention also relates to a method as defined in the opening part of claim 7.

Such an apparatus is known from EP 569 597 A1. During reading of the data carrier a high-frequency signal and low-frequency signals are derived from the detection signal. From the high-frequency signal an information signal is derived and channel decoding and error correction can be effected. From the low-frequency signals further signals are derived for positioning the transducer relative to the data carrier and for focussing of a radiation beam produced by the transducer onto the data carrier. The data carrier has for example a radiation-sensitive layer, so that it can be inscribed and/or rewritten. The detection of the optical pattern on the data carrier is most reliable when the radiation beam is perpendicularly incident on the data carrier. As the density with which data is recorded on an optical data carrier increases the tolerance for deviations (tilt) of the angle of incidence from the perpendicular angle diminishes. The tilt can have a radial component and a tangential component. The tangential component (tangential tilt) is defined here as the component of the deviation in a plane oriented parallel to the track to be read and transversely to the data carrier. The radial component (radial tilt) is the component of the deviation in a plane oriented transversely to the track to be read and transversely to the data carrier.

In the known read/write apparatus the transducer comprises a transparent plate arranged in an optical path from a radiation source to the data carrier. The orientation of the transparent plate depends on an error signal which is a measure of the radial and/or tangential tilt of the data carrier. For this purpose, in a first embodiment, a sub-beam is split off the beam which is reflected from the data carrier. The sub-beam is imaged onto a four-quadrant detector via a screen which blocks a central portion of the beam. The error signal is derived from differences between four signals generated by means of the detector. In another embodiment the apparatus is equipped with auxiliary means for determining the orientation of the transparent plate and auxiliary means for determining the orientation of the data carrier. Both auxiliary means comprise a separate radiation source and a detector for generating four signals. In this embodiment the error signal is derived from the two sets of four signals.

SUMMARY OF THE INVENTION

It is an object of the invention to provide an apparatus of the type defined in the opening part, which requires less additional optical means for generating the error signal for the purpose of radial tilt correction.

To this end, according to the invention, the apparatus of the type defined in the opening part is characterized as defined in claim 1. To this end, the method of the type defined in the opening part is characterized as defined in claim 7.

In the apparatus in accordance with the invention the error signal is derived from the detection signal. Since this signal is generated anyway for the purpose of reading data from the data carrier no additional optical components are required.

BRIEF DESCRIPTION OF THE DRAWING

These and other aspects of the invention will be described in more detail with reference to the drawings. In the drawings:

FIG. 7 shows a relationship between some signals in the error signal generating means shown in FIG. 6.

DESCRIPTION OF THE PREFERRED EMBODIMENTS

Figure 1:
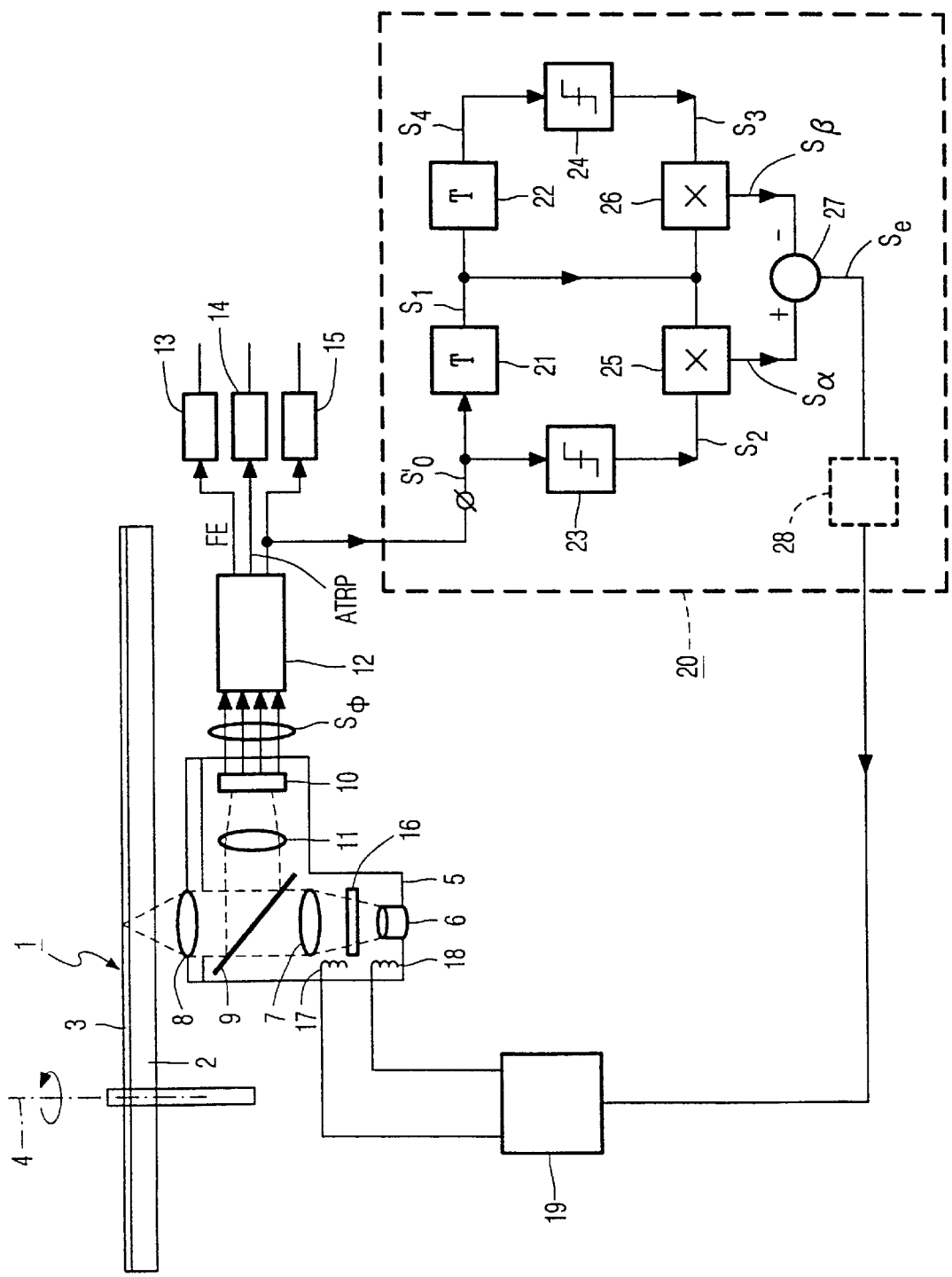
FIG. 1 shows a first embodiment of the apparatus in accordance with the invention.

FIG. 1 shows an apparatus for reading and/or writing information from/onto an optical data carrier 1. The data carrier 1 in the present case is of a (re)writable type. For this purpose, the data carrier has a radiation-sensitive layer 3 deposited on a transparent substrate 2. In or on the radiation-sensitive layer, for example, a radiation-sensitive dye layer or a so-called phase change layer, an optically readable pattern can be formed. Conversely, the data carrier 1 can be of the read-only type, the optically readable pattern being obtained, for example by pressing with the aid of a die. The apparatus comprises a transducer 5 arranged opposite the data carrier 1 and means for rotating the data carrier and for translating the transducer (not shown). The transducer 5 comprises a radiation source 6, in the form of, for example, a solid-state laser and optical means including a lens 7, a beam splitter 9, a focusing element 8 and an astigmatic element 11. The optical means guide a radiation beam from the radiation source 6 to detection means 10 via the data carrier 1. In the present case the detection means 10 comprise a detector having four sub-detectors which each supply a signal. The signals together form a four-fold detection signal $S_0$, which is a response of the transducer 5 to a signal x recorded on the data carrier. A preprocessor 12 derives from this four-fold signal a high-frequency signal $S_0'$ which is a measure of the sum of the four sensor signals from the sub-detectors. Apart from the high-frequency signal $S_0'$ the preprocessor 12 derives a focus error signal FE from the detection signal. The focus error signal is applied to a control circuit 13 which minimizes the focus error in a customary manner. The preprocessor 12 further generates a radial push-pull signal, which is applied to an FM demodulator 14.

Figure 1A:
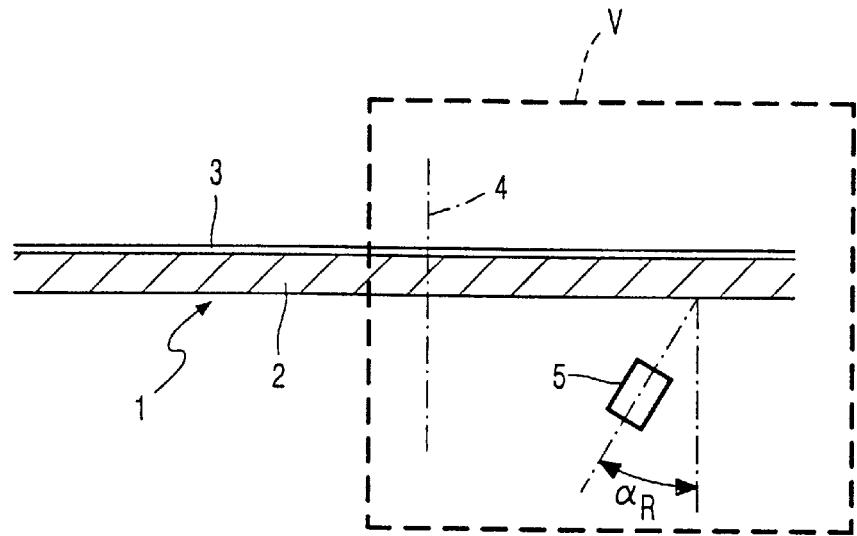
FIG. 1A represents diagrammatically a condition of radial tilt.

FIG. 1A shows diagrammatically a condition of radial tilt $\alpha_R$. By way of illustration the angle $\alpha_R$ is shown here to a highly exaggerated scale. In reality a tilt angle of the order of 1° can already impair the process of reading and/or writing of a data carrier. The radial component $\alpha_R$ is defined as the component of the deviation in a plane V oriented transversely to the track to be read and transversely to the data carrier 1.

The apparatus shown in FIG. 1 includes correction means 16, 17, 18 for reducing errors in the detection signal $S_0$ as a result of deviations of an angle at which the data carrier 1 is oriented at the location of the transducer 5. The correction means 16 in the present case comprise a transparent plate which also forms part of the optical means. The orientation of the transparent plate 16 can be controlled by means of actuators 17, 18. The actuators 17, 18 are controlled by a driver 19 in response to an error signal $S_e$. The apparatus further includes error signal generating means 20 for generating the error signal $S_e$ for the correction means 16–18.

Another embodiment does not employ a transparent plate as mentioned above and has correction means comprising actuators for controlling the orientation of the entire transducer 5. In yet another embodiment the detection signal $S_0$ is corrected electronically with the aid of the error signal $S_e$, if desired in conjunction with a mechanical correction of the orientation of the transducer or of a transparent plate as described above.

In the apparatus in accordance with the invention the error signal generating means 20 calculate the error signal $S_e$ from correlations between a first $S_1$ and a second auxiliary signal $S_2$ and from correlations between the first $S_1$ and a third auxiliary signal $S_3$. The first auxiliary signal $S_1$ is derived from the detection signal $S_0$ with a first delay T. The magnitude of the first delay corresponds to the duration of one revolution of the data carrier. The second auxiliary signal $S_2$ is an estimate of the signal recorded on the data carrier 1 based on the detection signal $S_0$. The third auxiliary signal $S_3$ is also an estimate of the signal recorded on the data carrier 1, be it that this third auxiliary signal $S_3$ is derived from the detection signal $S_0$ with a second delay 2T, the magnitude of the second delay 2T corresponding to the duration of two revolutions of the data carrier 1. The first $S_1$ and the third auxiliary signal $S_3$ have a delay T and 2T, respectively, with respect to the second auxiliary signal $S_2$.

In the embodiment shown the error signal generating means 20 utilize the high-frequency signal $S_0'$ derived from the detection signal $S_0$ the preprocessor. In another embodiment the error signal generating means are coupled directly to the transducer.

In the apparatus in accordance with the invention the error signal generating means 20 comprise delay means 21 for generating the first auxiliary signal $S_1$. In the present case the first auxiliary signal $S_1$ is identical to the high-frequency signal $S_0'$ which has been delayed by a first time interval T. The error signal generating means 20 further comprise first estimation means 23 for generating the second auxiliary signal $S_2$ which is an estimate of the signal recorded on the data carrier 1. In the present case the first estimation means 23 are formed by a level detector. The output signal $S_2$ of the level detector indicates whether or not the value of the detection signal $S_0'$ exceeds a threshold value.

Second estimation means 24, having second delay means 22, generate the third auxiliary signal $S_3$. In the embodiment shown in FIG. 1 the second estimation means 24 have a second level detector which derives the third auxiliary signal $S_3$ from a fourth auxiliary signal $S_4$. This fourth auxiliary signal $S_4$ has been derived from the first auxiliary signal $S_1$ with the aid of delay means 22.

First correlation means 25, comprising a multiplier, generate a first correlation signal $S_{60}$ which is a measure of correlation between the first $S_1$ and the second auxiliary signal $S_2$. Second correlation means 26, also comprising a multiplier, generate a second correlation signal $S_\beta$ which is a measure of correlation between the first $S_1$ and the third auxiliary signal $S_3$. Signal combination means 27 generate the error signal from the first $S_\alpha$ and the second correlation signal $S_\beta$. In the present embodiment of the invention the signal combination means 27 are adapted to determine the difference between the first $S_\alpha$ and the second correlation signal $S_\beta$. In another embodiment the signal combination means 27 comprise, for example, a divider which determines the quotient of the first $S_\alpha$ and the second correlation signal $S_\beta$.

The apparatus of FIG. 1 operates as follows. During reading of the data carrier 1 the data carrier 1 rotates about the axis 4. The radiation source 6 generates a radiation beam which is imaged on the data carrier 1 via the transparent plate 16, the lens 7, the beam splitter 9, and the focussing element 8. The focussed beam is reflected from the data carrier 1 to an extent which depends on the nature and/or the shape of the optical pattern of the data carrier 1 at the location of incidence.

The reflected beam is imaged on the detector 10 via the lens 8, the beam splitter 9 and the astigmatic element 11. When the beam is incident perpendicularly to the data carrier 1, the size of the light spot imaged on the data carrier is minimal. In the case of radial tilt, i.e. a deviation of the angle of incidence from the perpendicular angle in a radial direction with respect to the axis of rotation 4 of the data carrier 1, the light spot is larger and reflection occurs not only from the optical pattern to be read from the data carrier 1 but also from patterns in adjacent tracks.

Therefore, the high-frequency signal $S_0'$ can be defined as:

$$S_0' = \alpha . x_{n+1} + x_n + \beta . x_{n-1} \tag{1}$$

Therein, $x_n$ is the signal recorded in the track to be read. The signals recorded in the next track and the preceding track are designated $x_{n+1}$ and $x_{n-1}$, respectively. The factors $\alpha$ and $\beta$ successively indicate the degree of crosstalk from the next track and the degree of crosstalk from the preceding track.

The first auxiliary signal $S_1$ corresponds to the high-frequency signal $S_0'$ delayed by a first time interval. The magnitude T of the first time interval corresponds to the duration of one revolution of the data carrier. This signal consequently complies with:

$$S_1 = \alpha . x_n + x_{n-1} + \beta . x_{n-2} \tag{2}$$

The second auxiliary signal $S_2$ is obtained from the high-frequency signal by level detection, indicated by [ ]:

$$S_2 = [S_0'] = X_n \tag{3}$$

Here, $X_n$ the estimated value of the signal recorded on the data carrier.

In the case of a comparatively small deviation of the angle of incidence of the radiation beam on the data carrier the factors $\alpha$ and $\beta$ are comparatively small, so that:

$$[S_0'] \approx x_n \tag{4}$$

The fourth auxiliary signal $S_4$ is obtained from the first auxiliary signal $S_1$ with the aid of delay means, the magnitude of the time interval by which the first auxiliary signal is delayed corresponding to the duration of one revolution of the data carrier. The signal $S_4$ consequently complies with:

$$S_4 = \alpha \cdot x_{n-1} + x_{n-2} + \beta \cdot x_{n-3} \quad (5)$$

The third auxiliary signal $S_3$ is obtained from the fourth auxiliary signal by level detection:

$$S_3 = [S_4] \quad (6)$$

In the case of a comparatively small deviation of the angle of incidence of the radiation beam on the data carrier, the following applies again:

$$S_3 \approx x_{n-2} \quad (7)$$

The first correlation signal $S_\alpha$ is the product of the first $S_1$ and the second auxiliary signal $S_2$. Hence, it follows from formulas (2) and (3) that:

$$S_\alpha \approx \alpha \cdot x_n^2 + x_{n-1} \cdot x_n + \beta \cdot x_{n-2} \cdot x_n \quad (8)$$

The second correlation signal $S_\beta$ is the product of the first $S_1$ and the third auxiliary signal $S_3$. Therefore, it follows from formulas (2) and (6) that:

$$S_\beta \approx \alpha \cdot x_n \cdot x_{n-2} + x_{n-1} \cdot x_{n-2} + \beta \cdot x_{n-2}^2 \quad (9)$$

The error signal $S_e$, in the present case the difference between the signals $S_\alpha$ and $S_\beta$, is therefore:

$$S_e \approx \alpha \cdot x_n^2 + x_{n-1} \cdot x_n + \beta \cdot x_{n-2} \cdot x_n - \alpha \cdot x_n \cdot x_{n-2} - x_{n-1} \cdot x_{n-2} - \beta \cdot x_{n-2}^2 \quad (10)$$

This signal has a relatively low-frequency component $S_{lf}$ and a relatively high-frequency component $S_{hf}$, where $$S_{lf} = \alpha \cdot \langle x_n^2 \rangle - \beta \cdot \langle x_{n-2}^2 \rangle \quad (11)$$

and $$S_{hf} = \alpha \cdot (x_n^2 - \langle x_n^2 \rangle) + x_{n-1} \cdot x_n + \beta \cdot x_{n-2} \cdot x_n - \alpha \cdot x_n \cdot x_{n-2} - x_{n-1} \cdot x_{n-2} - \beta \cdot (x_{n-2}^2 - \langle x_{n-2}^2 \rangle) \quad (12)$$

The low-frequency component complies with $S_{lf} = (\alpha - \beta) \cdot X$, where X is the average value of the signals $x_n^2$ and $x_{n-2}^2$. This component is proportional to the difference in crosstalk from the next track and from the preceding track. As in the case of a sufficiently small beam diameter at the location of the data carrier crosstalk can occur from only one direction a positive value of $S_{lf}$ is an indication of crosstalk from the next track and a negative value is an indication of crosstalk from the preceding track. The correction means 16, 17, 18 can be dimensioned in such a manner that they can only follow the relatively low-frequency component. A value of the low-frequency component $S_{lf}$ which differs from 0 causes an action of the correction means 16–18, for example a rotation of the transparent plate 16, as a result of which the shape of the beam is adapted, causing the value of the low-frequency component $S_{lf}$ to be reduced. In the case of rapid correction means the high-frequency component $S_{hf}$ may adversely affect the operation. In that case the correction signal generating means 20 may be provided with a low-pass filter 28 (shown in broken lines) in order to reject the high-frequency components.

Although in general the signals recorded on the data carrier are substantially non-correlated in adjacent tracks, there is a fairly large degree of correlation in a tangential direction. As a result of this, the error signal generating means 20 can also function properly when the magnitude of the delay produced in the first and the second delay unit deviates slightly from the duration T of one revolution and the duration 2T of two revolutions of the data carrier. The same applies if owing to an additional tangential tilt the crosstalk components $\alpha \cdot x_n$ and $\beta \cdot x_{n-2}$ have a slightly greater or smaller phase shift with respect to the component $x_{n-1}$ in the high-frequency signal $S_0'$.

Figure 2:
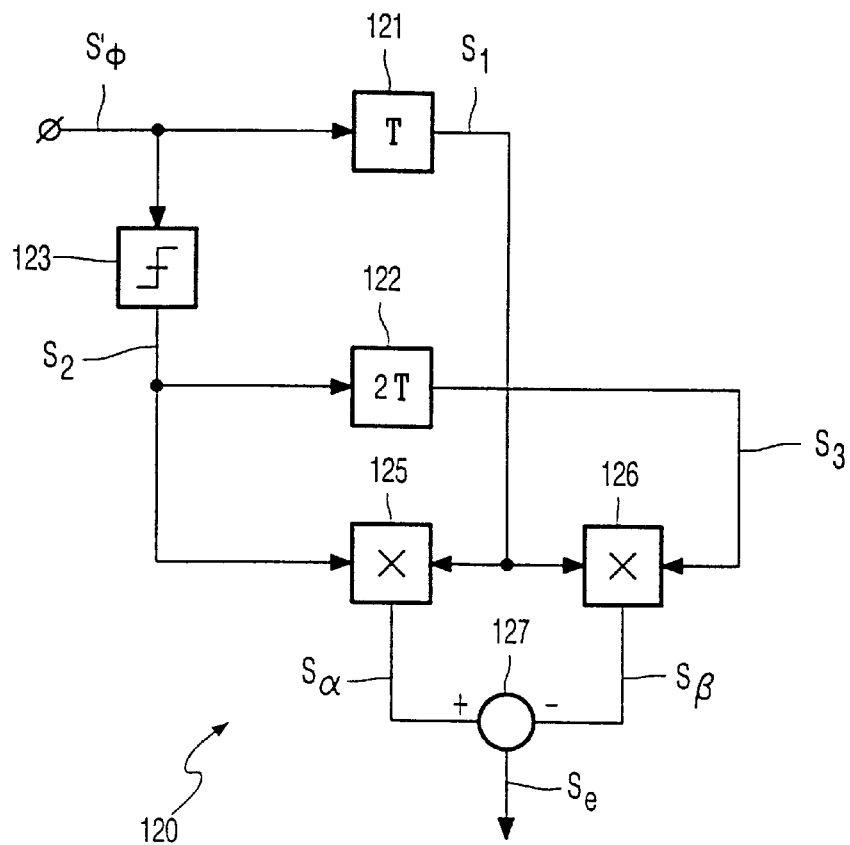
FIG. 2 shows a variant of the error signal generating means of the embodiment shown in FIG. 1.

A variant of the embodiment of FIG. 1 is shown in FIG. 2. Parts therein which correspond to those in FIG. 1 bear the same reference numerals incremented by 100. In this variant the level detector 123 for generating the second auxiliary signal $S_2$ also forms part of the second estimation means. The signal generated by means of this level detector 123 is delayed by the second time interval in the second delay means 122.

Figure 3:
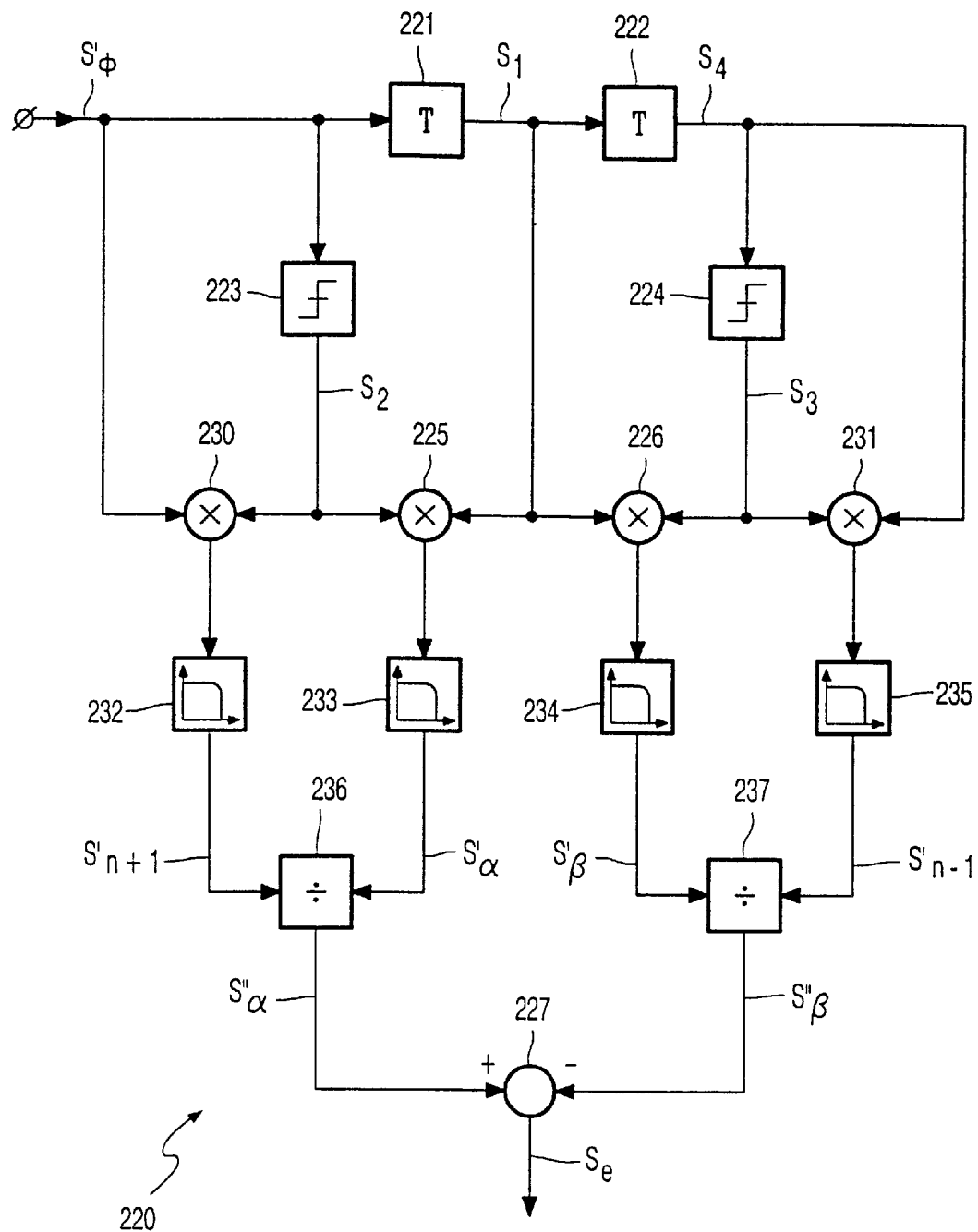
FIG. 3 shows the error signal generating means in a second embodiment.

In the embodiment shown in FIG. 1 and the variant in FIG. 2 the strength of the error signal $S_e$ also depends on the signal recorded on the data carrier. FIG. 3 shows the error signal generating means 220 in a second embodiment of the apparatus in accordance with the invention. In said embodiment the error signal $S_e$ is substantially independent of the recorded signal x. Parts in FIG. 3 have reference numerals which are 200 higher.

In the embodiment shown in FIG. 3 the error signal generating means 220 further include third correlation means 230 for generating a third correlation signal $S_{n+1}$ which is a measure of correlation between the high-frequency signal $S_0'$ and the second auxiliary signal $S_2$, and which is therefore also a measure of correlation between the detection signal $S_0$ and the second auxiliary signal $S_2$. The error signal generating means further include delay means 222 for generating a fourth auxiliary signal $S_4$ which corresponds to the detection signal $S_4$ delayed by the second time interval 2T. The error signal generating means 220 also include fourth correlation means 231 for generating a fourth correlation signal $S_{n-1}$ which is a measure of correlation between the third $S_3$ and the fourth auxiliary signal $S_4$.

In the embodiment shown in FIG. 3 the signal combination means include filters 232–235, a first 236 and a second divider 237, and a difference unit 227. The filters 232–235 perform low-pass filtering upon each of the correlation signals $S_{n+1}$, $S_\alpha$, $S_\beta$ and $S_{n-1}$. The first divider 236 generates a first ratio signal $S''_\alpha$. This is a measure of the filtered first correlation signal $S'_\alpha$ divided by the filtered third correlation signal $S'_{n+1}$. The second divider 237 generates a second ratio signal $S''_\beta$. This is a measure of the filtered second correlation signal $S'_\beta$ divided by the filtered fourth correlation signal $S'_{n-1}$. The difference unit generates a difference signal $S_e$ which is a measure of the difference between the first $S''_\alpha$ and the second ratio signal $S''_\beta$.

The error signal generating means shown in FIG. 3 operate as follows.

In the same way as in the embodiment of FIG. 1 a first correlation signal $S_\alpha$ as defined in formula (8) and a second correlation signal as defined in formula (9) are generated. The signal $S'_\alpha$ generated by means of the filter 233 complies with:

$$S'_\alpha \approx \alpha \cdot x_n^2 = \alpha \cdot X \quad (13)$$

The third correlation signal $S_{n-1}$, generated from the high-frequency signal $S_0'$ and the second auxiliary signal $S_2$ by the third correlation means 230, complies with:

$$S_{n+1} = S_0' \cdot S_2 \quad (14)$$

From formulas 1, 4 and 14 it follows that:

$$S_{n+1} \approx \alpha \cdot x_n \cdot x_{n+1} + x_n \cdot x_n + \beta \cdot x_n \cdot x_{n-1} \quad (15)$$

The signal $S'_{n+1}$ obtained from $S_{n+1}$ by means of the low-pass filter 232 complies with:

$$S'_{n+1} \approx X \tag{16}$$

The first ratio signal $S''_{60}$, which is the filtered first correlation signal $S'_\alpha$ divided by the filtered third correlation signal $S'_{n+1}$, is therefore independent of the signal recorded on the data carrier 1. Likewise, it follows that the second ratio signal $S''_\beta$ is independent of the detected signal.

Figure 4:
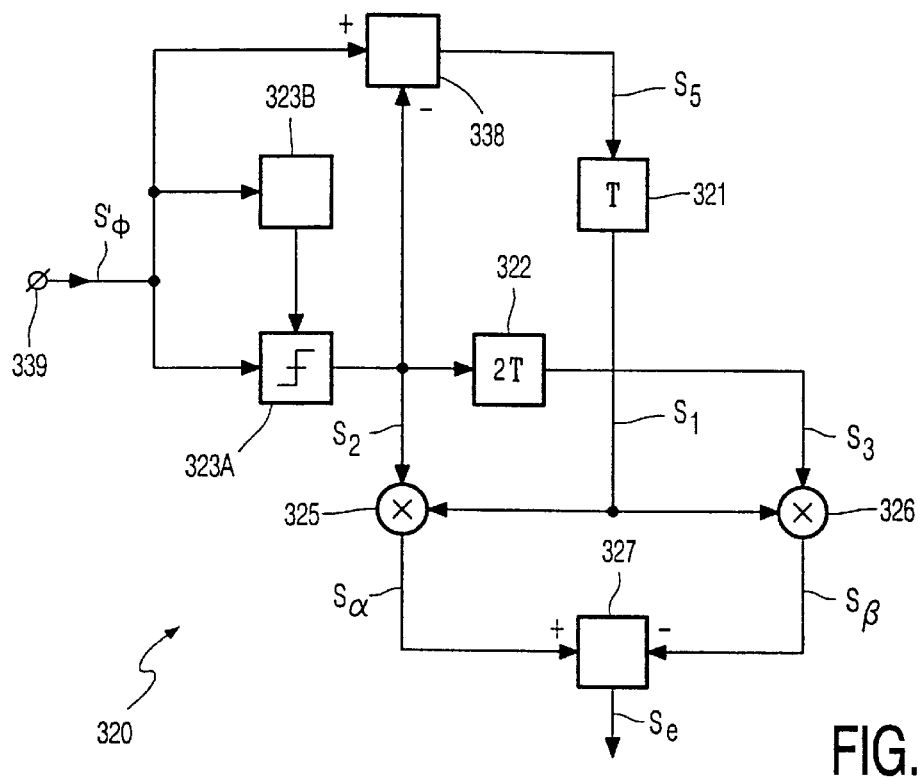
FIG. 4 shows the error signal generating means in a third embodiment.

FIG. 4 shows error signal generating means 320 in a third embodiment of the apparatus in accordance with the invention. Parts therein bear reference numerals which are 300 higher. In the present embodiment the first estimation means 323$_A$, 323$_B$ for generating a second auxiliary signal $S_2$ are constructed as a level detector 323$_A$ coupled to control means 323$_B$ for adaptively controlling the detection level of the level detector 323$_A$. In the present embodiment the control means 323$_B$ have an input for receiving the high-frequency signal $S_0'$ and the control means 323$_B$ calculate the detection level from the running average of the high-frequency signal $S'$. In the third embodiment the first auxiliary signal $S_1$ is derived from the high-frequency signal $S_0'$ by comparison of the high-frequency signal $S_0'$ with the second auxiliary signal $S_2$ in a signal combination unit 338. In the present case, the signal combination unit 338 generates a fifth auxiliary signal $S_5$ in response to the difference between the high-frequency signal $S_0'$ and the second auxiliary signal $S_2$. The first delay means 321 generate a first auxiliary signal $S_1$ which corresponds to the fifth auxiliary signal $S_5$ delayed by the first time interval T. The first delay means 321 thus produce a delay by the first time interval T in the first auxiliary signal $S_1$. In a variant, instead of the delay means 321, delay means are interposed between the input 339 of the error signal generating means 320 and the non-inverting input of the signal combination unit 338, and further delay means are interposed between the output of the level detector 323$_A$ and the inverting input of the signal combination unit 338.

The level detector 323$_A$ now also forms part of second estimation means for generating a third auxiliary signal $S_3$ which is an estimate of the signal recorded on the data carrier 1 delayed by the second time interval 2T. The duration of the second time interval substantially corresponds to the duration 2T of two revolutions of the data carrier. The second estimation means also include second delay means 322 for generating a third auxiliary signal S3. The third auxiliary signal $S_3$ is an estimate of the signal recorded on the data carrier delayed by the second time interval 2T.

The first correlation means 325 generate a first correlation signal $S_{60}$ by multiplying the first auxiliary signal $S_1$ by the second auxiliary signal $S_2$. The second correlation means 326 generate a second correlation signal $S_\beta$ by multiplying the first auxiliary signal $S_1$ by the third auxiliary signal $S_3$. The signal combination means 327 calculate the error signal $S_e$ by subtracting the second correlation signal $S_\beta$ from the first correlation signal $S_\alpha$.

The operation of the error signal generating means in the present embodiment differs from that in the embodiments shown in FIGS. 1 through 3 in that the first auxiliary signal $S_1$ is derived from the high-frequency signal $S_0'$ in another manner.

$$S_1 = \alpha.x_n + (x_{n-1} - X_{n-1}) + \beta.x_{n-2} \approx \alpha.x_n + \beta.x_{n-2} \tag{17}$$

Herein, $X_{n-1}$ is the value of the second auxiliary signal $S_2$, which is an estimate of the signal recorded on the data carrier 1.

The first correlation signal $S_\alpha$ is:

$$S_\alpha = S_1.S_2 \tag{18}$$

Substitution of formulas 4 and 17 therein yields:

$$S_\alpha \approx \alpha.x_n^2 + \beta.x_n.x_{n-2} \tag{19}$$

The second correlation signal is:

$$S_\beta = S_1.S_3 \tag{20}$$

Substitution of formulas 7 and 17 therein yields:

$$S_\beta \approx \alpha.x_n.x_{n-2} + \beta.x_{n-2}^2 \tag{21}$$

The error signal $S_e$ is consequently:

$$S_e \approx \alpha.(x_n^2 - x_n.x_{n-2}) + \beta.(x_n.x_{n-2} - x_{n-2}^2) \tag{22}$$

The residual low-frequency component after low-pass filtering is:

$$S_{lf} \approx \alpha.x_n^2 - \beta.x_{n-2}^2 \tag{23}$$

Low-pass filtering can be effected in a dedicated filter or in other components, for example a slowly responding actuator or a driver for the actuator having a small bandwidth.

Figure 5:
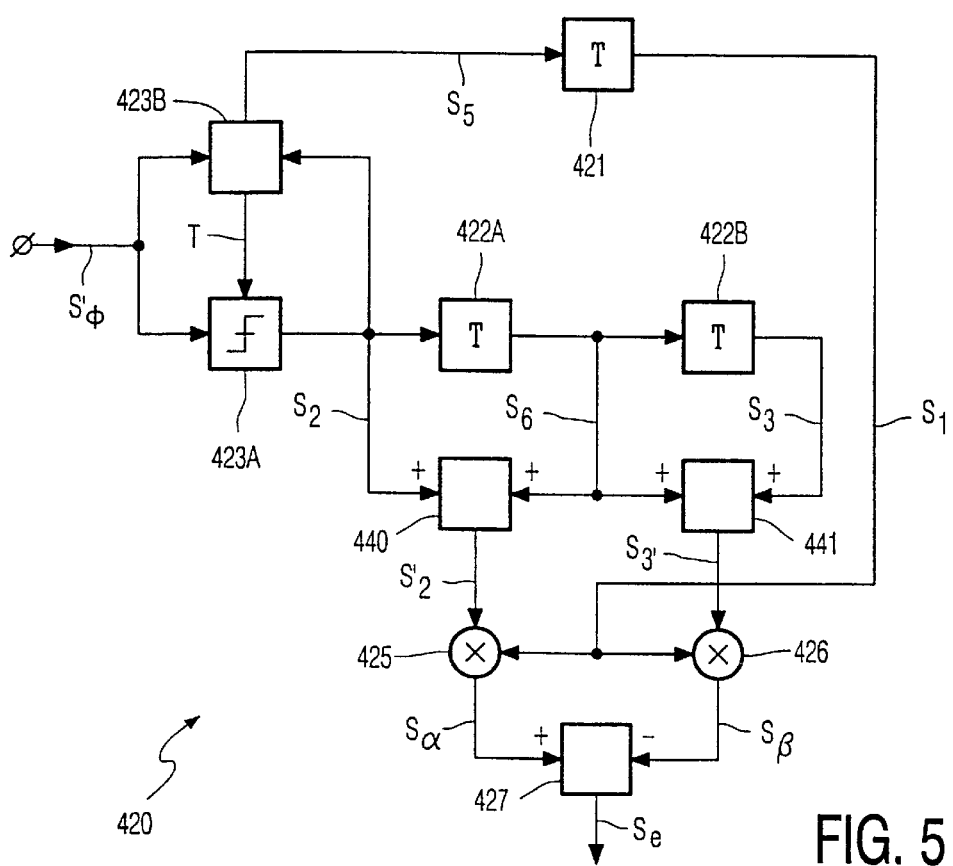
FIG. 5 shows a variant of the error signal generating means shown in FIG. 4.

FIG. 5 shows a variant. Parts therein which correspond to those in FIG. 1 bear the same reference numerals incremented by 400. In the fourth embodiment the control means 423$_B$ have an input for receiving the second auxiliary signal $S_2$ and the detection level of the level detector 423$_A$ is set to such a value by the control means 423$_B$ that on the average the second auxiliary signal $S_2$ is as many times above as below the detection level. Furthermore, the embodiment shown in FIG. 5 differs from that of FIG. 4 in that the correlation means 425, 426 for generating the first $S_\alpha$ and the second correlation signal $S_\beta$ respectively receive a modified second auxiliary signal $S'_2$ and third auxiliary signal $S'_3$. The modified second auxiliary signal $S'_2$ is the sum of the second auxiliary signal $S_2$ and a sixth auxiliary signal $S_6$. The modified third auxiliary signal $S'_3$ is the sum of the third auxiliary signal $S_3$ and the sixth auxiliary signal $S_6$. The second delay means now comprise a first 422$_A$ and a second delay unit 422$_B$. By means of the second delay unit 422$_A$ the sixth auxiliary signal $S_6$ is generated. The sixth auxiliary signal $S_6$ corresponds to the second auxiliary signal $S_2$ delayed by a time interval of a duration T.

Figure 6:
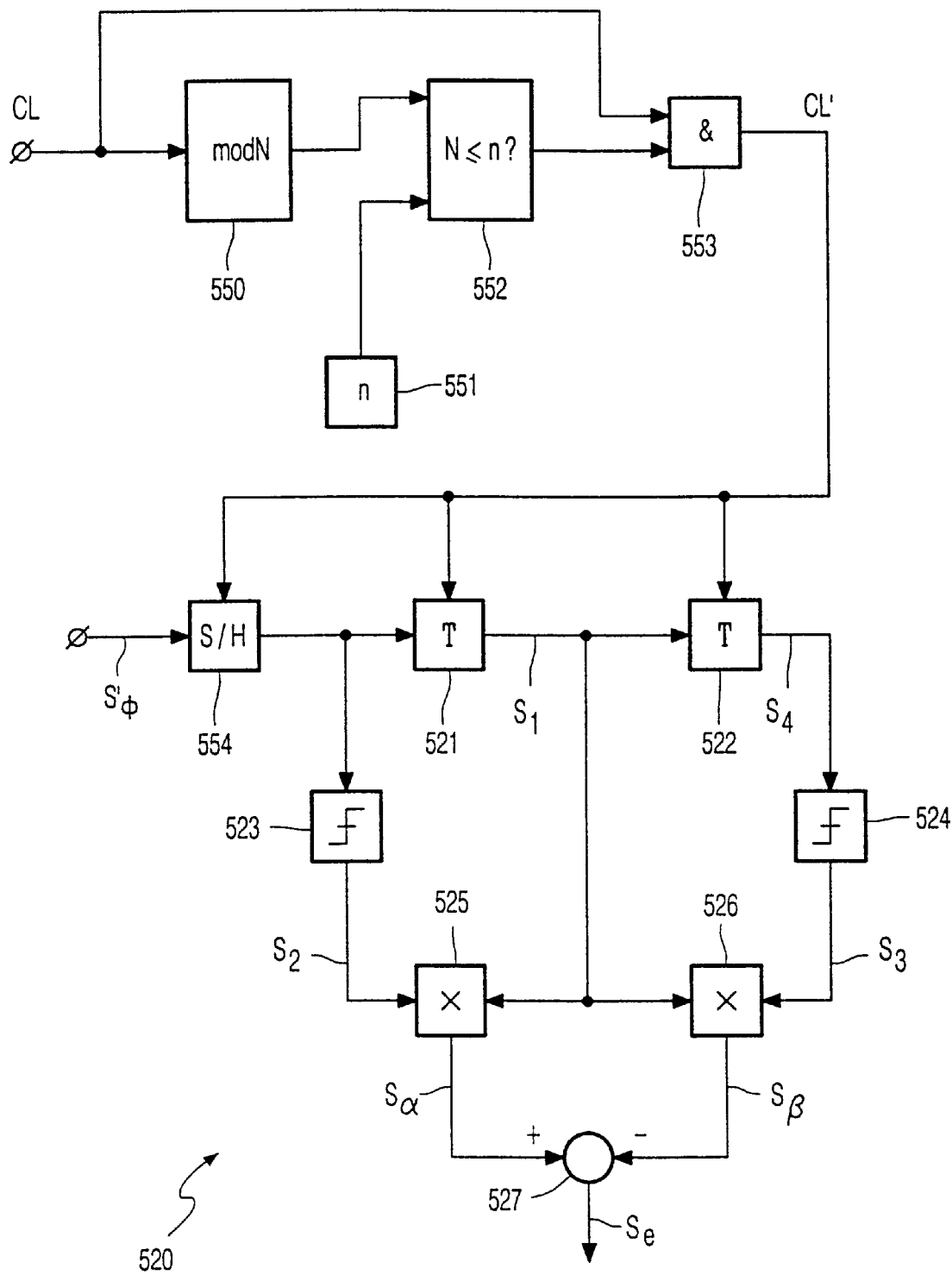
FIG. 6 shows the error signal generating means in a fourth embodiment.

In the embodiments shown in FIGS. 1 through 5 the high-frequency signal $S_0'$ is processed by the error signal generating means with a clock (not shown) which is in synchronism with that of the high-frequency signal $S_0'$. A fourth embodiment is shown in FIG. 6. This embodiment is characterized in that the error signal generating means include means for generating a modified clock signal C1'. The modified clock signal C1' occurs intermittently with a frequency which is one or more times the revolution frequency of the data carrier 1.

In the embodiment shown the means for generating the modified clock signal include a modulo N counter 550, a comparator 552 for comparing a signal on the output of the modulo N teller 550 with a signal on the output of a register 551 which represents a value n<N, and an AND gate 553. The error signal generating means 520 further include a sample and hold register 554 for the high-frequency signal $S_0'$. The modified clock signal C1' clocks the sample and hold register 554 and the delay units 521, 522.

The embodiment shown in FIG. 6 operates as follows. The modulo N counter 550 is clocked by means of a clock signal C1 (see FIG. 7A). Each clock pulse causes a change of state of the counter 550. An output of the counter 550 represents a value corresponding to the state. FIG. 7B represents diagrammatically the change of state as a function of time. During each time interval having a duration T/2 the count represented at the output of the counter 550 increases from 0 to N−1. Although in the Figure the increase is shown as a continuous increase, it varies stepwise in reality, The comparator 552 supplies a logic "1" signal during a time interval $t_{on}$ in which the count is smaller than or equal to the value n stored in the register 551. During the intervals $t_{on}$ the modified clock signal C1' corresponds to the clock signal C1 (see FIG. 7C). If the count is greater than the value n the comparator supplies a logic "0" signal. The modified clock signal C1' is then not active.

Since in the present embodiment the delay units 521, 522 are clocked with the intermittent clock signal C1' these units have to delay only signals of comparatively short duration. In the present case they twice delay a signal having a duration of $t_{on}$ by a period T corresponding to one revolution of the data carrier 1. As a result, the required storage capacity of the delay units 521, 522 is only a fraction $2.t_{on}/T$ of the storage capacity required when the delay units are clocked by the clock C1. The sample and hold register 554 is also clocked by the modified clock signal C1'. Thus, it is achieved that the phase difference between the high-frequency signal $S_0'$ and the other signals $S_1$, $S_4$ in the error signal generating means 520 is always one or more times the period T, as a result of which the error signal generating means 520 also supply a valid error signal $S_e$ outside the periods $t_{on}$. This can also be achieved when the sample and hold register is included in the error signal generating means 520 at another location, for example between the first estimation means 523 and the first correlation means 525, or after the signal combination means 527.

Figure 8:
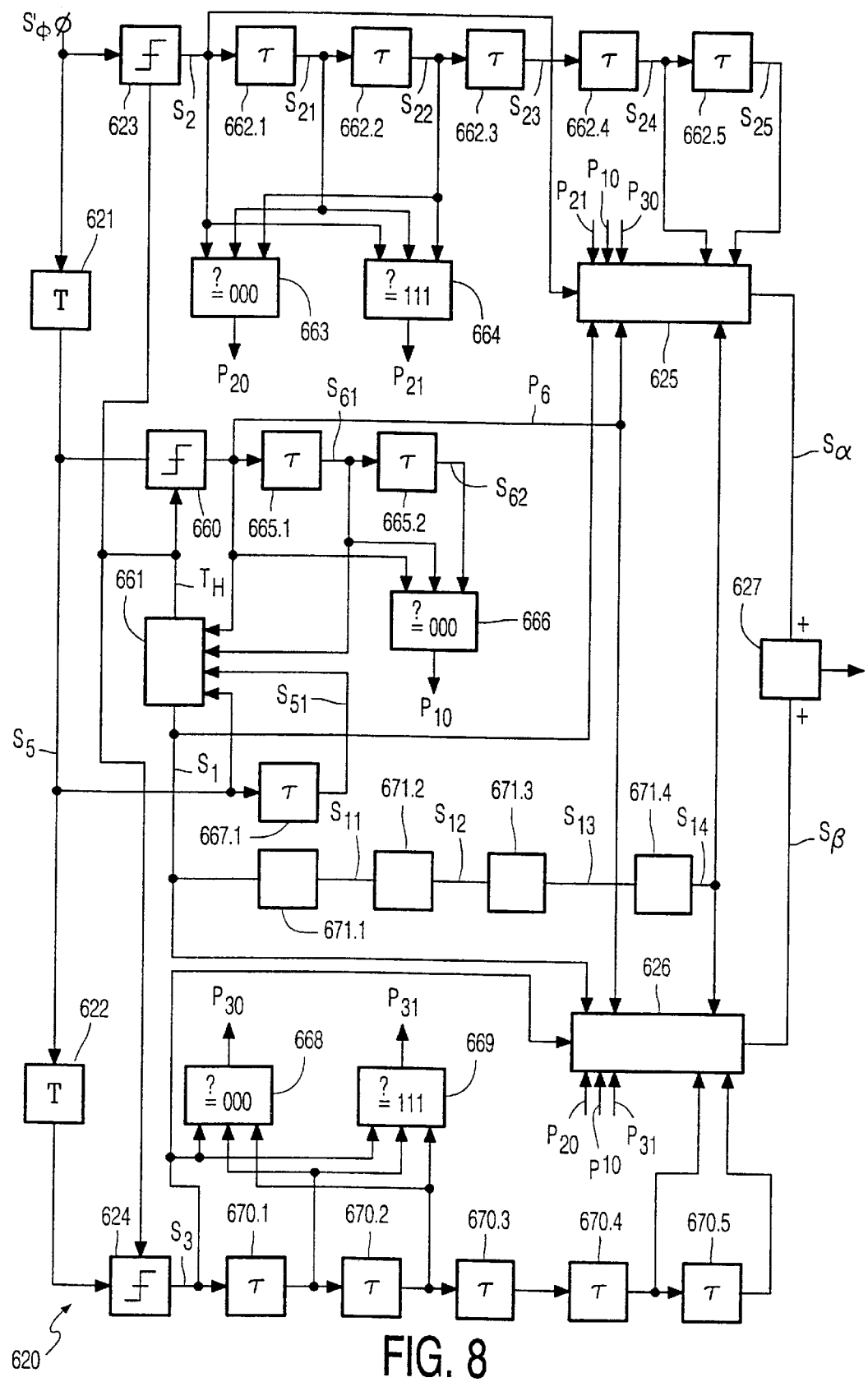
FIG. 8 shows the error signal generating means in a fifth embodiment.

FIG. 8 shows a fifth embodiment. Parts therein which correspond to those in FIG. 1 bear the same reference numerals incremented by 600. In addition to the delay elements 621 and 622 the present embodiment further includes a delay line 662 with delay elements 662.1–662.5, a delay line 665 with delay elements 665.1 and 665.2, a delay element 667.1, a delay line 670 with delay elements 670.1–670.5, and a delay line 671 with delay elements 671.1–671.4. The delay element 667.1 and the delay elements of said delay lines each produce a delay by one clock cycle.

In the embodiment shown in FIG. 8 the error signal generating means 620 include means 621, 660 for generating a sixth auxiliary signal $S_6$ which is an estimate of the signal x recorded on the data carrier and which has a first delay T with respect to the second auxiliary signal $S_2$.

Figure 8A:
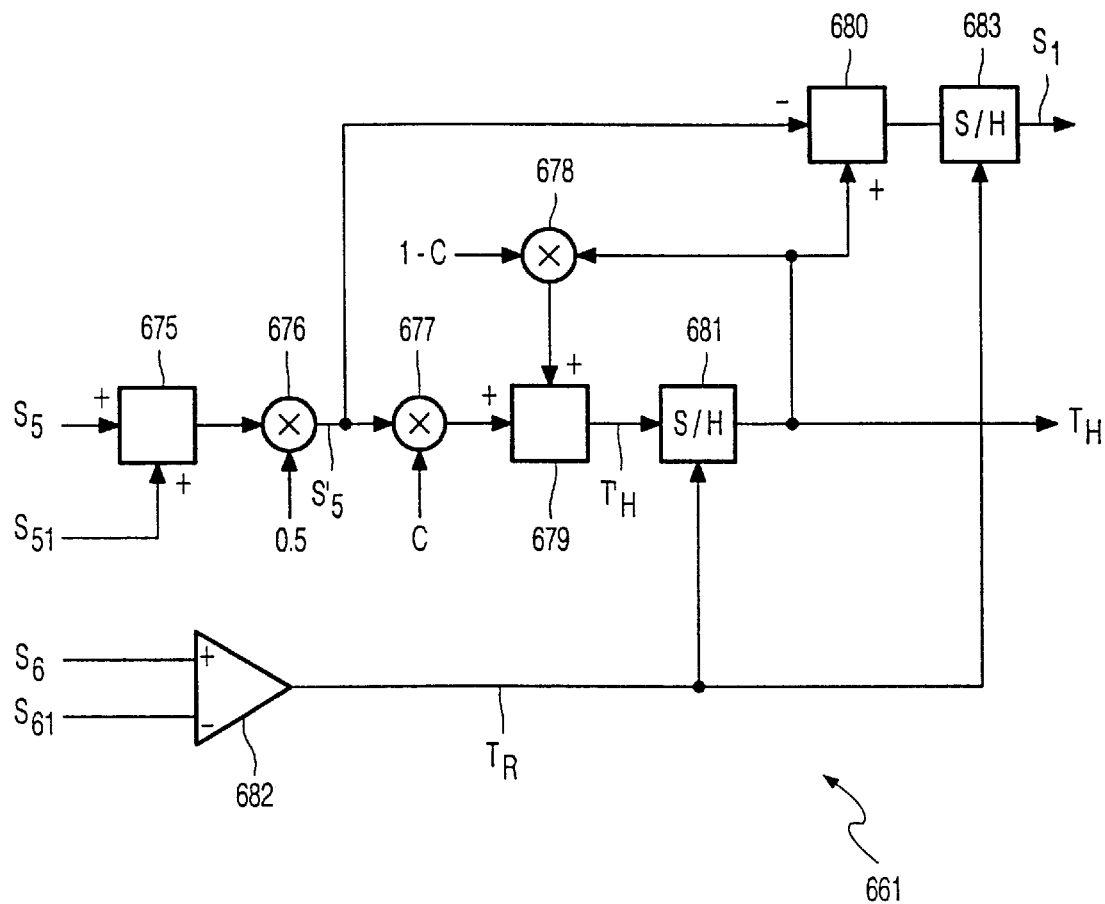
FIG. 8A shows a first part of the means of FIG. 8 in more detail.

With the aid of means 661, which are shown in more detail in FIG. 8A, the first auxiliary signal $S_1$ is generated. Said means 661 further calculate a level $T_H$ for the level detectors 623, 660 and 624. First correlation means 625 generate the first correlation signal $S_\alpha$ which is a measure of the correlation between the first $S_1$ and the second auxiliary signal $S_2$. Second correlation means 626 generate the second correlation signal $S_\beta$ from the first $S_1$ and the third auxiliary signal $S_3$. The first correlation means 625 are shown in more detail in FIG. 8B. The second correlation means 626 are identical thereto. The error signal generating means 620 further include pattern detection means 663, 664, 666, 668 and 669. The pattern detection means 664, 666 and 668 generate auxiliary control signals $P_{21}$, $P_{10}$ and $P_{30}$ for controlling the first correlation means 625. The auxiliary control signals $P_{21}$, $P_{10}$ and $P_{30}$ successively indicate the occurrence of the bit pattern '111' in the second auxiliary signal $S_2$, the bit pattern '000' in the first auxiliary signal $S_1$ and the bit pattern '000' in the third auxiliary signal $S_3$. The pattern detection means 663, 666 and 669 generate auxiliary control signals $P_{20}$, $P_{10}$ and $P_{31}$ for controlling the second correlation means 626. These auxiliary control signals successively indicate the occurrence of the bit pattern '000' in the second auxiliary signal $S_2$, the bit pattern '000' in the first auxiliary signal $S_1$ and the bit pattern '111' in the third auxiliary signal $S_3$.

The means 661 are described in more detail with reference to FIG. 8A. The means 661 calculate the detection level $T_H$ from the values of the amplitudes of the signal $S_5$ at both sides of a transition in the signal $S_6$ from a first level to a second level. The transitions are detected by means of a comparator 682, which compares the current value $S_6$ and the preceding value $S_{61}$ of the signal $S_6$. By means of an adder 675 and a multiplier 676 signal $S_5'$ is generated which corresponds to half the sum of the current value $S_5$ and the preceding value $S_{51}$ of the signal $S_5$. Subsequently, the signal $T_H'$ is generated from the signal $T_H$ and the signal $S_5'$ by means of multipliers 677 and 678 and an adder 679. Upon each detected transition of the signal $S_5$ the comparator 682 generates a signal $T_R$ which causes the signal $T_H'$ to be sampled by the sample and hold means 681. The signal $T_H$ is a running average of the signal $S_5'$. By an appropriate choice of the coefficient c, it is possible to achieve either a slower or a more rapid adaptation of the signal $T_H$ to the signal $S_5'$. In the present case the value of this coefficient is 0.05. The means 680 calculate the difference between the signal $S_5'$ and the signal $T_H$. The sample and hold means 683 sample this difference when a transition is detected by the means 682. In response thereto the sample and hold means 683 supply the first auxiliary signal $S_1$.

Figure 8B:
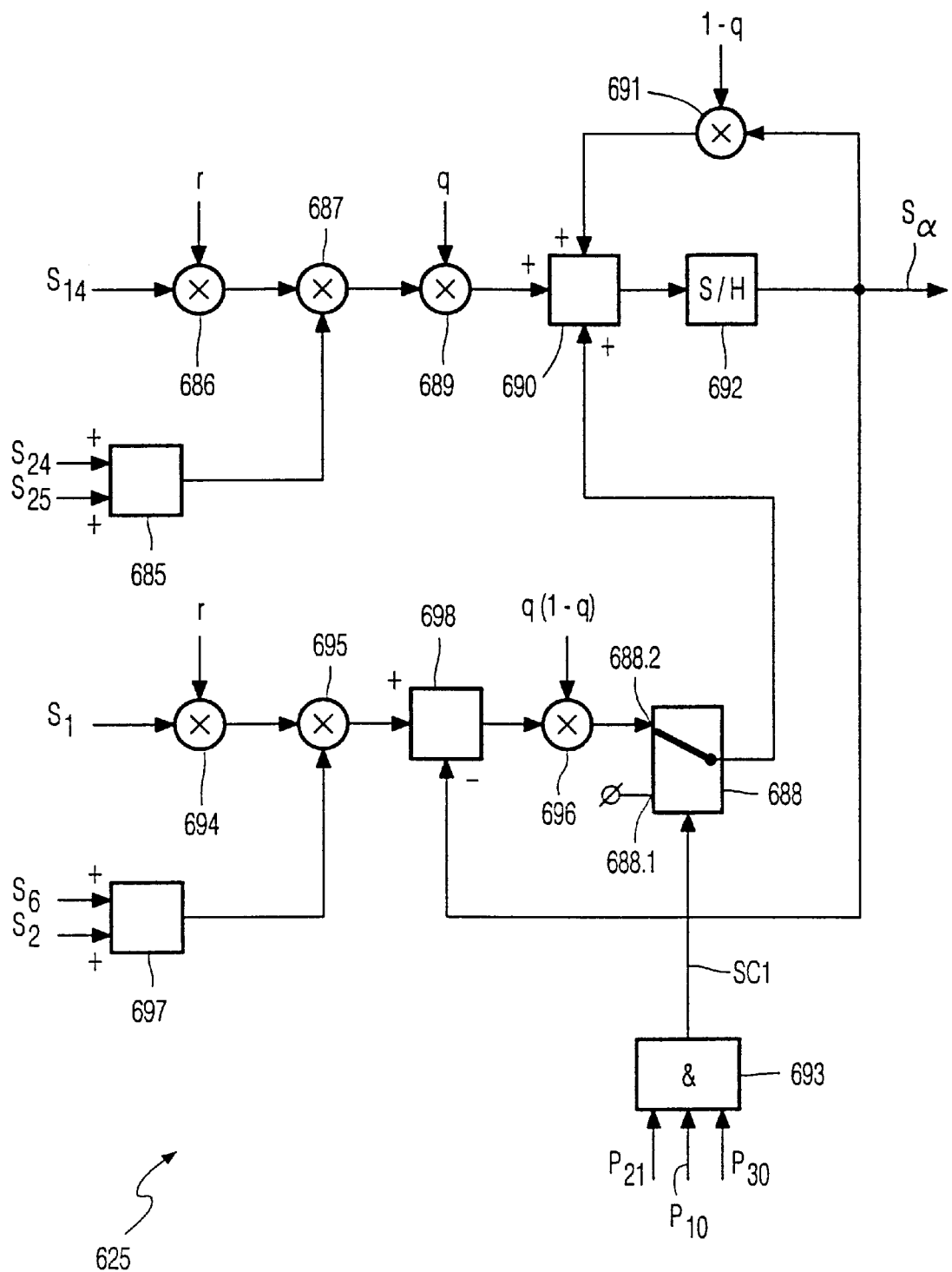
FIG. 8B shows a second part of the means of FIG. 8 in more detail.

The first correlation means 625 are now described in more detail with reference to FIG. 8B. The second correlation means 626 are identical thereto. In the second correlation means the signals $S_3$, $S_{34}$, $S_{35}$, $P_{20}$, $P_{31}$ and $S_\beta$ successively replace the signals $S_2$, $S_{24}$, $S_{25}$, $P_{21}$, $P_{30}$ and $S_\alpha$. The first correlation means 625 include multipliers 686, 687, 689, 691, 694, 695 and 696, and signal combination units 685, 690, 697 and 698. The signal combination unit 698 calculates a difference between the signals on its inputs. The other signal combination units calculate a sum. The correlation means 625 further include sample and hold means 692, a multiplexer 688 and an AND gate 693. The AND gate 693 derives the first control signal $S_{C1}$ from the auxiliary control signals $P_{21}$, $P_{10}$, $P_{30}$. The first control—signal $S_{C1}$ has a logic value "1" exclusively in the case of a simultaneous occurrence of the bit pattern '111' in the auxiliary signal $S_2$, the pattern '000' in the signal $S_1$ and the pattern '000' in the signal $S_3$. In the other cases the first control signal $S_{C1}$ has a logic value "0". The parts 664, 666, 668 and 693 form first signaling means. In each clock cycle a recalculation of the first correlation signal $S_\alpha$ is effected. The method of recalculation depends on the value of the first control signal $S_{C1}$. For a value "0" of the first control signal $S_{C1}$ the recalculated value of the first correlation signal ($S_\alpha$) is independent of the first ($S_1$) and the second auxiliary signal ($S_2$). In that case the following holds:

$$S_\alpha(t+1)=q.r.S_{14}.(S_{24}+S_{25})+(1-q).S_\alpha(t),$$

where $S_\alpha(t+1)$ and $S_\alpha(t)$ successively are the recalculated value and the preceding value of $S_\alpha$.

A value "1" of the second control signal $S_{C1}$ causes recalculation of the first correlation signal $S_\alpha$ from the first auxiliary signal $S_1$ and the second auxiliary signal $S_2$. Then, the following applies:

$$S_\alpha(t+1)=q.r.S_{14}.(S_{24}+S_{25})+q.(1-q).r.S_1.(S_2+S_6)+(1-q)^2.S_\alpha(t).$$

Likewise, the recalculation of the second correlation signal $S_\beta$ depends on the value of a second control—signal derived from the signals $P_{20}$, $P_{10}$ and $P_{31}$ by means of an AND gate. As a result of this dependence in the recalculation of the correlation signals $S_\alpha$, $S_\beta$ it is achieved that the error signal $S_e$ is more immune to intersymbol interference.

In the embodiments described above the error signal generating means are realized by means of dedicated hardware. In other embodiments the error signal is calculated by means of a general purpose processor controlled by a suitable program.

The error signal generating means described hereinbefore are also suitable for apparatuses for inscribing an optical data carrier. In that case use can be made of information recorded in headers in the data carrier.

It is obvious that many variants are possible within the scope defined in the Claims. For example, instead of the level detection other forms of bit detection are employed, such as PRML (partial response maximum likelihood) detection or FRML (full response maximum likelihood) detection.

The invention further relates to any new characteristic feature and any new combination of characteristic features.

What is claimed is:

1. An apparatus for reading and/or writing information from/onto an optical data carrier (1), which apparatus comprises a transducer (5) for optically reading a signal (x) recorded on the data carrier and in response thereto supplying a detection signal ($S_0$), and means for rotating the data carrier (1) and for translating the transducer (5), which apparatus further comprises correction means (16, 17, 18) for the reduction of errors in the detection signal ($S_0$) as a result of radial tilt of the transducer (5) with respect to the data carrier (1) and further comprises error signal generating means (20) for generating an error signal ($S_e$) for the correction means (16, 17, 18), characterized in that the error signal generating means (20) calculate the error signal ($S_e$) from correlations between a first auxiliary signal ($S_1$) and a second auxiliary signal ($S_2$) and from correlations between the first auxiliary signal ($S_1$) and a third auxiliary signal ($S_3$), the second auxiliary signal ($S_2$) and the third auxiliary signal ($S_3$) being estimates of the signal (x) recorded on the data carrier (1), the first, the second, and the third auxiliary signal being derived from the detection signal ($S_0$), the first auxiliary signal ($S_1$) having a first delay (T) with respect to the second auxiliary signal ($S_2$), which first delay has a magnitude corresponding to the duration of one revolution of the data carrier, the third auxiliary signal ($S_3$) having a second delay (2T) with respect to the second auxiliary signal ($S_2$), which second delay (2T) has a magnitude corresponding to the duration of two revolutions of the data carrier (1).

2. An apparatus as claimed in claim 1, characterized in that the error signal generating means (20) include:

first delay means (21) for producing the first delay in the first auxiliary signal ($S_1$), first estimation means (23) for generating the second auxiliary signal ($S_2$) from the detection signal ($S_0$), second estimation means (24) having second delay means (22) for generating the third auxiliary signal ($S_3$) and producing the second delay in said third auxiliary signal, first correlation means (25) for generating a first correlation signal ($S_\alpha$) which is a measure of the correlation between the first auxiliary signal ($S_1$) and the second auxiliary signal ($S_2$) and second correlation means (26) for generating a second correlation signal ($S_\beta$) which is a measure of the correlation between the first auxiliary signal ($S_1$) and the third auxiliary signal ($S_3$), signal combination means (27) for generating the error signal ($S_e$) from the first correlation signal ($S_\alpha$) and the second correlation signal ($S_\beta$).

3. An apparatus as claimed in claim 2, characterized in that the error signal generating means (220) further include third correlation means (230) for generating a third correlation signal ($S_{n+1}$) which is a measure of correlation between the detection signal ($S_0$) and the second auxiliary signal ($S_2$), delay means (222) for generating a fourth auxiliary signal ($S_4$) which corresponds to the detection signal ($S_0$) delayed by the second time interval (2T), fourth correlation means (231) for generating a fourth correlation signal ($S_{n-1}$) which is a measure of correlation between the third auxiliary signal ($S_3$) and the fourth auxiliary signal ($S_4$), the signal combination means including filters (232–235) for low-pass filtering each of the correlation signals ($S_{n+1}$, $S_\alpha$, $S_\beta$, $S_{n-1}$), a first divider (236) for generating a first ratio signal ($S''_\alpha$) which is a measure of the filtered first correlation signal ($S'_\alpha$) divided by the filtered third correlation signal ($S'_{n+1}$), a second divider (237) for generating a second ratio signal ($S''_\beta$) which is a measure of the filtered second correlation signal ($S'_\beta$) divided by the filtered fourth correlation signal ($S'_{n-1}$), a difference unit (227) for generating a difference signal ($S_e$) which is a measure of the difference between the first ratio signal ($S''_\alpha$) and the second ratio signal ($S''_\beta$).

4. An apparatus as claimed in claim 1, characterized in that the first auxiliary signal ($S_1$) is derived from the detection signal ($S_0$) by comparing the detection signal ($S_0$) with the second auxiliary signal ($S_2$).

5. An apparatus as claimed in claim 1, characterized in that the error signal generating means (520) include means (550–553) for generating a modified clock signal (C1'), which modified clock signal (C1') appears intermittently with a frequency equal to one or more times the revolution frequency of the data carrier (1).

6. An apparatus as claimed in claim 1, characterized in that the error signal generating means include means for generating a sixth auxiliary signal ($S_6$) which is an estimate of the signal (x) recorded on the data carrier and which has a first delay (T) with respect to the second auxiliary signal ($S_2$), and the error signal generating means include first signalling means (664, 666, 669, 693) for signalling by means of a first control signal ($S_{C1}$) the simultaneous occurrence of the bit pattern '111' in the second auxiliary signal ($S_2$), the bit pattern '000' in the sixth auxiliary signal ($S_6$) and the bit pattern '000' in the third auxiliary signal ($S_3$), and the error signal generating means include second signalling means (663, 666, 668) for signalling by means of a second control signal ($S_{C2}$) the simultaneous occurrence of the bit pattern '000' in the second auxiliary signal ($S_2$), the bit pattern '000' in the sixth auxiliary signal ($S_6$) and the bit pattern '111' in the third auxiliary signal ($S_3$), the first control signal ($S_{C1}$) causing recalculation of the first correlation signal ($S_\alpha$) from the first auxiliary signal ($S_1$) and the second auxiliary signal ($S_2$) and the second control signal causing recalculation of the second correlation signal ($S_\beta$) from the first auxiliary signal ($S_1$) and the third auxiliary signal ($S_3$).

7. A method of reading and/or writing information from/onto an optical data carrier (1), in which the data carrier (1) is rotated with respect to a transducer (5) which is movable in a radial direction, for optically reading a signal recorded on the data carrier and in response thereto supplying a detection signal ($S_0$), in which correction means (16, 17, 18) bring about a reduction of errors in the detection signal ($S_0$) as a result of radial tilt of the transducer with respect to the data carrier (1), and in which error signal generating means (20) generate an error signal ($S_e$) for the correction means (16–18), characterized in that the error signal generating means (20) calculate the error signal ($S_e$) from correlations between a first auxiliary signal ($S_1$) and a second auxiliary signal ($S_2$) and from correlations between the first auxiliary signal ($S_1$) and a third auxiliary signal ($S_3$), the second ($S_2$) and the third auxiliary signal ($S_3$) being estimates of the signal (x) recorded on the data carrier (1), the first auxiliary signal ($S_1$) having a delay with respect to the second auxiliary signal ($S_2$), which delay has a magnitude which substantially corresponds to the duration (T) of one revolution of the data carrier (1), and the third auxiliary signal ($S_3$) having a delay with respect to the second auxiliary signal ($S_2$), which delay has a magnitude which substantially corresponds to the duration (T) of two revolutions of the data carrier (1).

* * * * *